March 10, 1959    H. E. CHAPLIN ET AL    2,876,968
AIRCRAFT CONTROL MEANS
Filed April 12, 1954    4 Sheets-Sheet 1

March 10, 1959  H. E. CHAPLIN ET AL  2,876,968
AIRCRAFT CONTROL MEANS

Filed April 12, 1954 4 Sheets-Sheet 4

Inventors
Herbert E. Chaplin, Douglas Wakeford, Charles R. Churn
+ Maurice F. Huxley
By
Watson, Cole, Grindle + Watson
Attorneys United States Patent Office 2,876,968
Patented Mar. 10, 1959

2,876,968

AIRCRAFT CONTROL MEANS

Herbert Eugene Chaplin, Douglas Wakeford, Charles Reginald Churn, and Maurice Francis Huxley, Hayes, England, assignors to The Fairey Aviation Company Limited, Hayes, England, a British company Application April 12, 1954, Serial No. 422,600

Claims priority, application Great Britain April 16, 1953

10 Claims. (Cl. 244—83)

This invention relates to aircraft control means, and is particularly, though not exclusively, applicable to control means for high speed aircraft in which the lateral acceleration corresponding to a given angular movement of a control surface varies widely due to the fact that the speed of the aircraft varies over a wide range.

According to the present invention aircraft control means including a control surface, an operating member for it and means interconnecting them is characterised in that the interconnecting means include a variable ratio gear whereby the movement of the control surface produced by a given movement of the operating member can be varied, preferably continuously.

The ratio of the gear may be under manual control but preferably means are provided for varying it automatically in accordance with one or more factors corresponding to conditions of flight. In particular, means may be provided for varying the ratio in accordance with a function of the equivalent air speed, that is to say the true air speed multiplied by the square root of the relative density of the air. In one specific arrangement the ratio is caused to vary as the square of the equivalent air speed.

A convenient means of assessing the equivalent air speed is to balance the total head pressure against the static pressure, for example by means of a Pitot tube. The difference between these represents the impact pressure which varies as the square of the equivalent air speed over a considerable range of speeds. Conveniently the apparatus includes a bellows or capsules subject on the one side to a static pressure and on the other side subject to the total head pressure, the resultant force due to these two pressures acting on a spring, and hence the movement of the bellows or capsule varies as the square of the equivalent air speed.

The normal acceleration for a given angular movement of a control surface, such as an elevator, varies approximately as the square of the equivalent air speed over a considerable speed range, but when approaching sonic speed the effectiveness of the control surface decreases considerably. Thus according to a further feature of the invention, the variation of the gear ratio is limited by a variable stop which comes into action at a given Mach number, for example 0.9. Since a given Mach number represents a different equivalent air speed at different altitudes, the variable stop may conveniently be controlled in accordance with the altitude. Thus the apparatus may include a second capsule or bellows which is sealed, for example with air at sea level pressure, and which expands or contracts in accordance with variation of pressure at altitude. Accordingly the gearing ratio will vary substantially linearly with impact pressure up to a certain limit after which it will remain constant, this limit depending upon altitude and being greatest at sea level and gradually decreasing as the altitude increases.

The invention may be carried into practice in different ways, but one specific embodiment of the invention, applied to an aircraft capable of speeds in the sonic range will now be described by way of example with reference to the accompanying drawings, in which.

General arrangement

Figure 1:
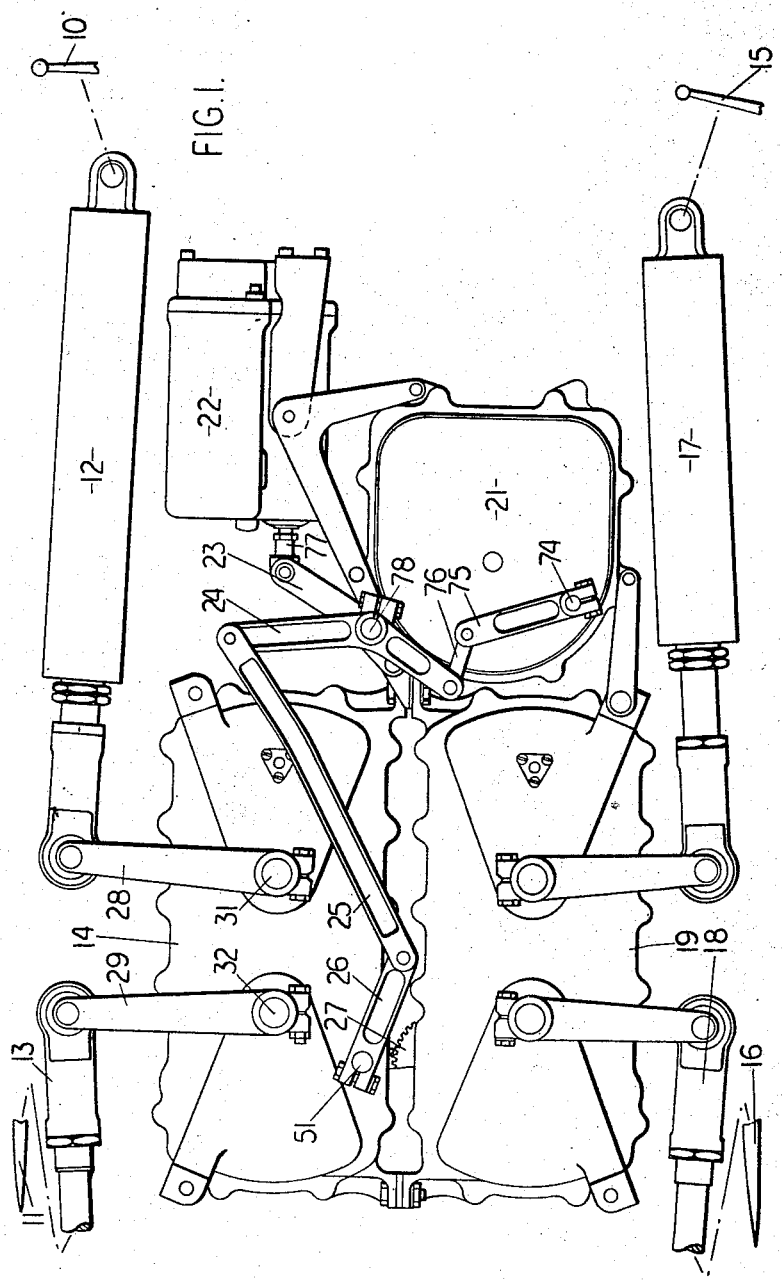
Figure 1 shows the general arrangement of the control system.

An operating member 10, for example a control column, is arranged to move a control surface 11, for example an elevator, through the medium of two control rods 12 and 13 and a variable-ratio gear unit 14, through which the rods 12 and 13 are coupled together. A second operating member 15, for example a rudder bar, is arranged to move a second control surface 16, for example a rudder, through the medium of two control rods 17 and 18 and a similar variable-ratio gear unit 19.

The ratios of both the gear units are controlled by a bellows unit 21 which controls the operation of a linear actuator 22 coupled to the variable-ratio gear unit 14 through levers 23, and 24, a link 25 and an arm 26. The two variable-ratio gear units 14 and 19 are coupled together through spur gearing 27 in such a way that the ratios of both units will be changed together.

The ratio of the gear units 14 and 19 determines the angular movements of the control surfaces 11 and 16 for given angular movements of the operating members 10 and 15.

The bellows unit 21 is designed to control the linear actuator 22 so that the ratio of the gear units 14 and 19 will vary with the square of the equivalent air speed of the aircraft, that is to say the product of the true air speed and the square root of the relative density of the air.

The variable-ratio gear unit

Since the gear units 14 and 19 are similar, it is thought that it will be sufficient to describe in detail one unit only.

Figure 2:
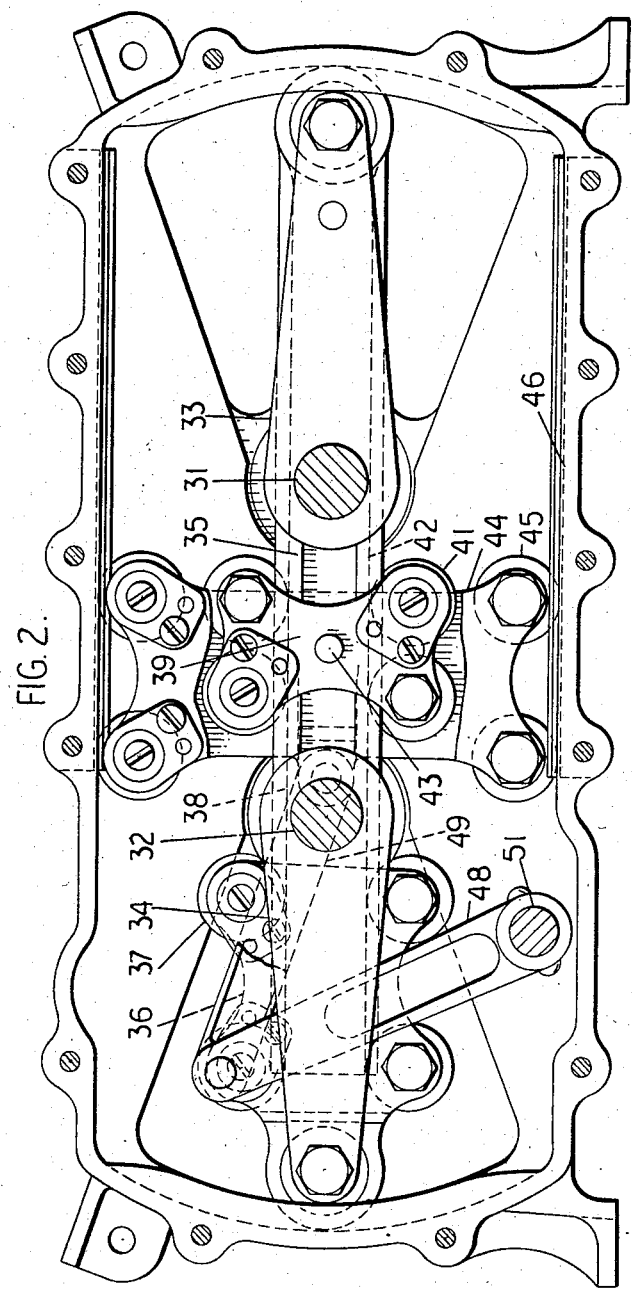
Figure 2 is a section through one of the variable-ratio gear units in the system shown in Figure 1.

The two control rods 12 and 13 are coupled to the gear unit 14 by being pivoted one to each of two cranks 28 and 29 which are keyed respectively one to each of two mutually parallel shafts 31 and 32 mounted for rotation in bearings in the casing of the gear unit (Figure 2). Also keyed one to each of the shafts 31 and 32 are cranks 33 and 34 which extend at right angles to the cranks 28 and 29 in opposite directions away from the centre of the gear unit. The cranks 28 and 33 and the shaft 31 thus form a bell crank and the cranks 29 and 34 and shaft 32 form another bellcrank, the two being rotatable about spaced axes, parallel with the pivot axes of the control rods 12 and 13 with the cranks 28 and 29.

The ends of the cranks 33 and 34 are coupled to a lever 35 the crank 33 being pivoted to one end of the lever while the crank 34 is connected to it by a pivot that can move along the length of the lever 35. Thus the end of the crank 34 is pivoted to a slider comprising a plate 36 below the lever 35 carrying wheels 37 which can run in grooves 38 along the sides of the lever 35. In this way the effective length of the lever 35 can vary in accordance with changes in the distance between the ends of the cranks 33 and 34.

The lever 35 can pivot about a movable fulcrum consisting of a plate 39 above the lever carrying wheels 41 which can run in grooves 42 along the sides of the lever 35. The grooves 42 for the wheels 41, and the grooves 38 for the wheels 37 are in spaced parallel planes so that the fulcrum can pass the plate 36 as they both slide along the lever.

The plate 39 is pivoted at 43 on a carriage consisting of a plate 44 carrying wheels 45 which can run in grooves 46 along the sides of the casing of the variable-ratio gear unit.

As the carriage slides along the grooves 46, the fulcrum, about which the lever 35 pivots, moves with it. When the fulcrum is at the middle of the lever 35 an angular movement of the crank 28 will produce an approximately equal movement of the crank 29.

When the fulcrum is nearer one end of the lever 35 as the lever pivots about the fulcrum, one end of it will move through a greater distance than the other end and consequently the cranks 28 and 29 will move by different amounts and thus an angular movement of the crank 28 will produce a different (greater or less) angular movement of the crank 29. In general, movement of the fulcrum along the lever 35 will vary the angular movement of the crank 29 produced by a given angular movement of the crank 28, and consequently will vary the movement of the control surface 11 produced by a given movement of the operating member 10.

Movement of the fulcrum is effected by a crank 48 keyed on a shaft 51 which also carries the arm 26 referred to above. The end of the crank 48 is connected by a link 49 to a point 50 on the carriage plate 44.

Accordingly turning of the arm 26 by the bellows unit will move the carriage plate 44 and hence the pivot 43 so as to vary the ratio of the gear unit.

The bellows unit

Figure 3:
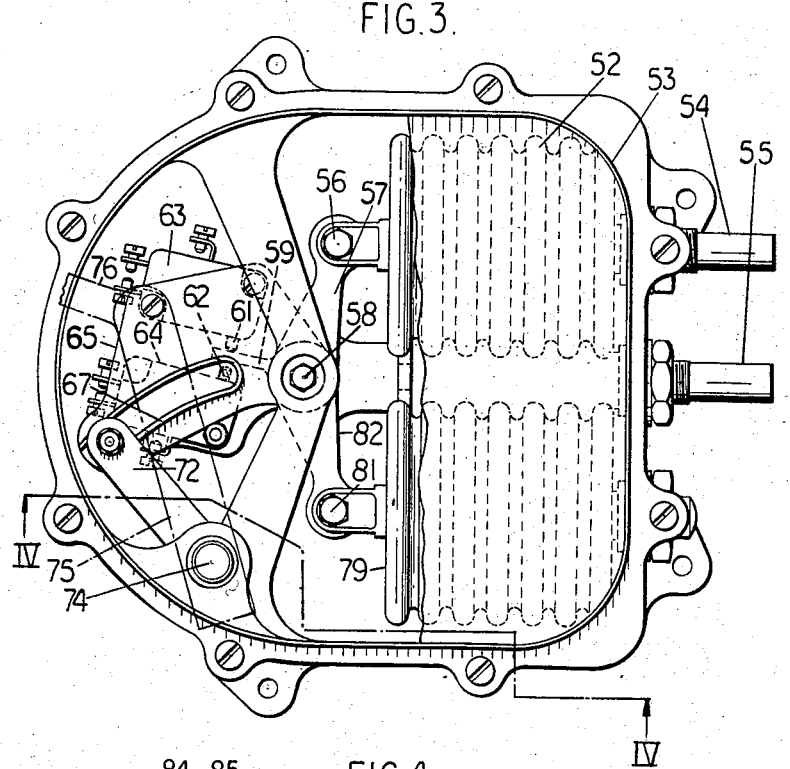
Figure 3 is a plan view, partly in section, of the bellows unit in the arrangement shown in Figure 1.
Figure 4:
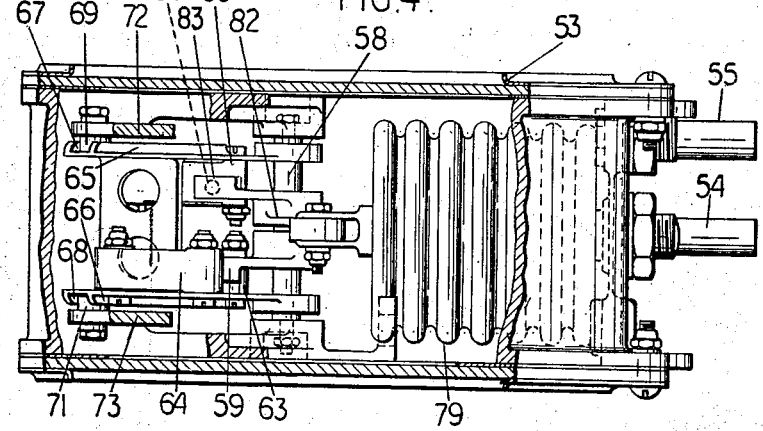
Figure 4 is an elevation, partly in section on the line IV—IV of Figure 3.
Figure 5:
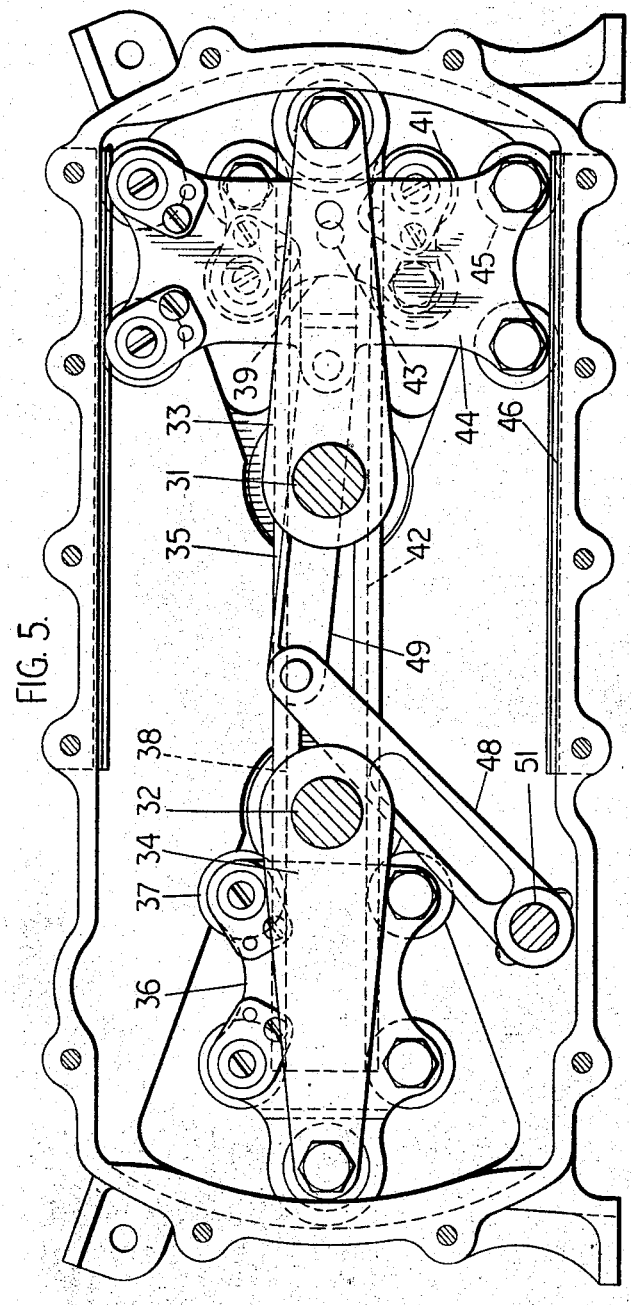
Fig. 5 shows the elements of Fig. 2 in another extended position.

As shown in Figures 3 and 4 the bellows unit includes a bellows 52 inside a casing 53. The interior of the bellows 52 is connected through a pipe 54 to a Pitot tube on the aircraft so that the pressure in the bellows 52 is the total Pitot pressure. The interior of the casing 53 is connected through a pipe 55 to a tube opening into the ambient air in a direction perpendicular to the fore-and-aft axis of the aircraft so that the pressure inside the casing 53 is equal to the static air pressure.

If the pressure inside the bellows 52 is greater than the pressure outside, it can expand against a force due to the elasticity of its walls. Thus the end of the bellows will take up a position dependent on the difference between the total Pitot pressure and the static air pressure which is the impact pressure on the aircraft. The end of the bellows 52 is pivotally connected at 56 to a lever 57 which can turn about a fixed shaft 58 and carries an operating arm 59 which turns with it about the shaft 58. The operating arm 59 moves between the operating studs 61 and 62 of two microswitches 63 and 64 carried on a frame comprising two spaced parallel plates 65 and 66 pivotally mounted about the shaft 58.

The plates 65 and 66 have in their outer surfaces cam grooves 67 and 68 in which run cam followers 69 and 71 mounted on arms 72 and 73 keyed to a shaft 74. Also keyed to the shaft 74 is an arm 75 coupled through a link 76 to one end of the lever 23 which in turn is coupled to the ram 22.

The linear actuator 22 includes an electric motor for moving a plunger 77 pivoted to the other end of the lever 23. The lever 23 is pivotally mounted on a fixed fulcrum 78 (Figure 1) near its centre so that movement of the plunger 77 will cause the lever 23 to turn.

Turning of the lever 23 causes rotation of the arms 72 and 73 through the links 75 and 76 so that the cam followers 69 and 71 move along the cam grooves 67 and 68 and cause the frame carrying the microswitches 63 and 64 to rotate about the shaft 58. The relationship between movement of the plunger 77 and movement of the frame depends on the lengths of the levers 23, 75, and 76, and on the configuration of the cam grooves 67 and 68.

The electric motor in the linear actuator 22 is energised in one sense or the other, that is to say so that it will project or withdraw the plunger 77, is response to closing of one or other of the microswitches 63 and 64 by movement of the operating arm 59 into contact with one or other of the operating studs 61 and 62.

The arrangement is such that when there is a change in the total Pitot pressure or the static air pressure or both, for example due to an increase in the aircraft's speed or a change in its altitude, so that there is a consequent movement of the end of the bellows 52, and the lever 57 and the operating arm 59 turn, the appropriate one of the microswitches is closed and the motor in the linear actuator 22 is energised to move the plunger 77 and hence, though the medium of the links, to rotate the frame carrying the microswitches in the sense in which the operating arm 59 moved. When the microswitch is moved sufficiently for its operating stud to be clear of the operating arm 59, the switch will open and the motor will be de-energised. Thus the frame carrying the microswitches will continually take up a position determined by that of the operating arm 59 and hence by the relationship between the total Pitot pressure and the static air pressure. The corresponding movement is transmitted from the linear actuator 22 to the variable ratio gear units 19 and 14 through the linkage 23, 24, 25, and 26 as already described.

Inside the casing 53 is a second bellows 79 which contains air at sea level pressure. The end of this bellows 79 is pivotally connected at 81 to a lever 82 carrying an operating arm 83 which can turn about the shaft 58 so that the operating arm 83 moves, as the end of the bellows 79 moves, towards or away from the operating stud 84 of a normally closed microswitch 85 carried on the same frame as the microswitches 63 and 64. When the operating arm 83 comes into contact with the operating stud 84 the circuit of the motor in the linear actuator 22 is opened so that further adjustment of the ratio of the variable-gear unit 14 is prevented.

The circumstances under which the microswitch 85 will be opened depend upon the relationship between the static air pressure and the sea level pressure, that is to say upon the altitude of the aircraft, because this determines the position of the operating arm 83 and also upon the relationship of the total Pitot pressure and the static air pressure that is to say upon the equivalent airspeed, because this determines the position of the operating arm 59, and hence the stable position of the frame carrying the microswitches 63, 64 and 85.

It can be arranged that variation of the ratio of the gear unit is prevented when there is any desired relationship between these quantities, but it is preferred that variation is prevented when the speed of the aircraft increases to about Mach .9. The Mach number depends for a given airspeed upon the altitude of the aircraft.

Operation

The position of the operating arm 59 will depend upon the relationship between the total pitot pressure and the static air pressure and hence upon the airspeed and altitude of the aircraft, and provided that the microswitch 85 is not open, the angular position of the lever 23 will depend upon the position of the operating arm 59.

The angular position of the lever 23 determines the angular position of the arm 26 and hence of the arm 48 in the variable-ratio gear unit 14 which determines by its angular position the position of the fulcrum of the lever 35 and the ratio of the gear. Thus as the altitude and equivalent airspeed of the aircraft change the ratio of the gear is varied so that when the pilot moves the control surface 11 by means of the operating member 10 the movement of the control surface 11 for a given movement of the operating member is determined automatically. Since the gear units 14 and 19 are coupled together through the gearing 27 the same ratio is maintained between the operating member 15 and the control surface 16. When the equivalent airspeed of the aircraft is greater than Mach .9 the ratio of the gear units remains constant.

There will be a servo motor coupled between the operating member and the control surface, by means of which a small force on the operating member is sufficient to move the control surface. The servo motor may be between the operating member and the gear or between the gear and the control surface.

In the former case a given movement of the servo motor will produce a smaller movement of the control surface at high speed and the load on the servo motor will be more nearly constant with varying speed. It will then generally be essential to provide servo operation of the variable gear since in most cases there will be a substantial reaction on the movable fulcrum or equivalent element to be controlled by the capsule unit.

Where the variable gear is arranged between the servo motor and the operating member it may in some cases be possible to actuate it directly without the interposition of an additional servo motor.

In a further arrangement the variable gear is combined with the servo motor by which the control surface is operated. For example a link connected to the control surface may be pivoted to the plunger of a ram which also carries an intermediate point of a floating lever. One end of the lever is controlled by the operating member whilst the other end is connected through a link to the control unit of the ram. By making the latter connection of pin and slot form comprising a pin on the control unit link running in an arcuate slot formed in the lever, the ratio between the movement of the operating member and the corresponding movement of the ram, and hence the control surface, can be varied by moving the pin along the slot. An extension on the link is conveniently connected to the bellows unit to effect such variation. Since the bellows unit is only called upon to move a link on which the maximum load is that required to shift the control unit, it is unnecessary to provide an additional servo unit for it.

In an arrangement such as that just described, the link to the control surface and the ram plunger may be connected to the lever at slightly different points so as to impose on the operating member a load corresponding to a fraction of that actually exerted on the control surface, in order to give the pilot the feel of the control.

What we claim as our invention and desire to secure by Letters Patent is:

1. Aircraft control means including a control surface, means for moving said control surface, means interconnecting said moving means and said control surface including a variable ratio gear for varying the movement of the control surface produced by a given movement of the moving means, a reference member, a first operating member movable in response to changes in a function of the equivalent airspeed, means operable in response to changes in the positional relationship between the reference member and the first operating member for varying the ratio of the gear and simultaneously moving the reference member in the sense to restore the said positional relationship, a second operating member arranged when in a certain positional relationship with the reference member to render the ratio varying means inoperable, and means for moving the second operating member in response to changes in altitude in the sense to decrease the gear ratio at which the varying means is rendered inoperable as the altitude increases.

2. Aircraft control means as claimed in claim 1 in which the second operating member is controlled by an aneroid.

3. Aircraft control means as claimed in claim 1 adjusted so that at a given altitude the ratio varying means is rendered inoperable at a Mach number of about 0.9.

4. Aircraft control means as claimed in claim 1 in which the first operating member is controlled by a device for comparing the total Pitot pressure with the static air pressure.

5. Aircraft control means as claimed in claim 4 in which the second operating member is controlled by an aneroid.

6. Aircraft control means including a control surface, means for moving said control surface, means for interconnecting said moving means and said control surface including a variable ratio gear for varying the movement of the control surface produced by a given movement of the moving means, means for varying the gear ratio, and a control unit comprising a chamber containing air at static pressure, within which are a reference member, a first bellows subject internally to the total Pitot pressure, a second bellows sealed with air at sea level pressure, a first operating member controlled by the first bellows, and arranged to render the ratio varying means operative in response to changes in the positional relationship of the first operating member to the reference member, and a second operating member controlled by the second bellows and arranged when in a certain positional relationship with the reference member to render the ratio varying means inoperable.

7. Aircraft control means as claimed in claim 6 in which the ratio varying means is operable in response to changes in the positional relationship between the reference member and the first operating member to vary the ratio of the gear and simultaneously to move the reference member in the sense to restore the said positional relationship.

8. Aircraft control means as claimed in claim 7 adjusted so that for a given altitude the ratio varying means is rendered inoperable at a Mach number of about 0.9.

9. Aircraft control means including a control surface, means for moving the said control surface means for interconnecting the said moving means and the said control surface including a variable ratio gear, a motor for varying the gear ratio, and a control unit comprising a chamber containing air at static pressure, a first bellows in the chamber subject internally to total Pitot pressure and a first operating member controlled thereby, a second bellows in the chamber sealed with air at sea level pressure and a second operating member controlled thereby, a reference member movable by the motor so that its position corresponds to the gear ratio, a first pair of switches controlling the operation of the motor and operated by relative movement between the first operating member and the reference member, and a further switch operated by relative movement between the second operating member and the reference member and serving to render the motor inoperative to vary in accordance with altitude the limiting value to which the ratio can be adjusted by the speed-responsive means.

10. Aircraft control means including a control surface, means for moving said control surface, means interconnecting said moving means and said control surface including a variable ratio gear for varying the movement of the control surface produced by a given movement of the moving means, an actuator for varying the ratio of the gear, the said actuator comprising a pressure-responsive device arranged to compare the total Pitot pressure with the static pressure and connected to vary the ratio of the gear in accordance with the difference between the said pressures in response to variations in equivalent air speed, and means responsive to changes in altitude for varying the range of gear ratio variation, the said altitude-responsive means comprising an operating member arranged to render the actuator inoperative beyond a certain limiting gear ratio, and an aneroid arranged to control the operating member to vary the limiting gear ratio in accordance with altitude.

References Cited in the file of this patent

UNITED STATES PATENTS

| | | |
|---|---|---|
| 2,205,610 | Van Nes | June 25, 1940 |
| 2,593,014 | Divoll | Apr. 15, 1952 |

FOREIGN PATENTS

| | | |
|---|---|---|
| 581,512 | Great Britain | Oct. 15, 1946 |